Oct. 13, 1942.  D. S. ROSS  2,298,313
CONTROLLABLE FLUSH ELECTRIC OUTLET
Filed March 1, 1941  4 Sheets-Sheet 1
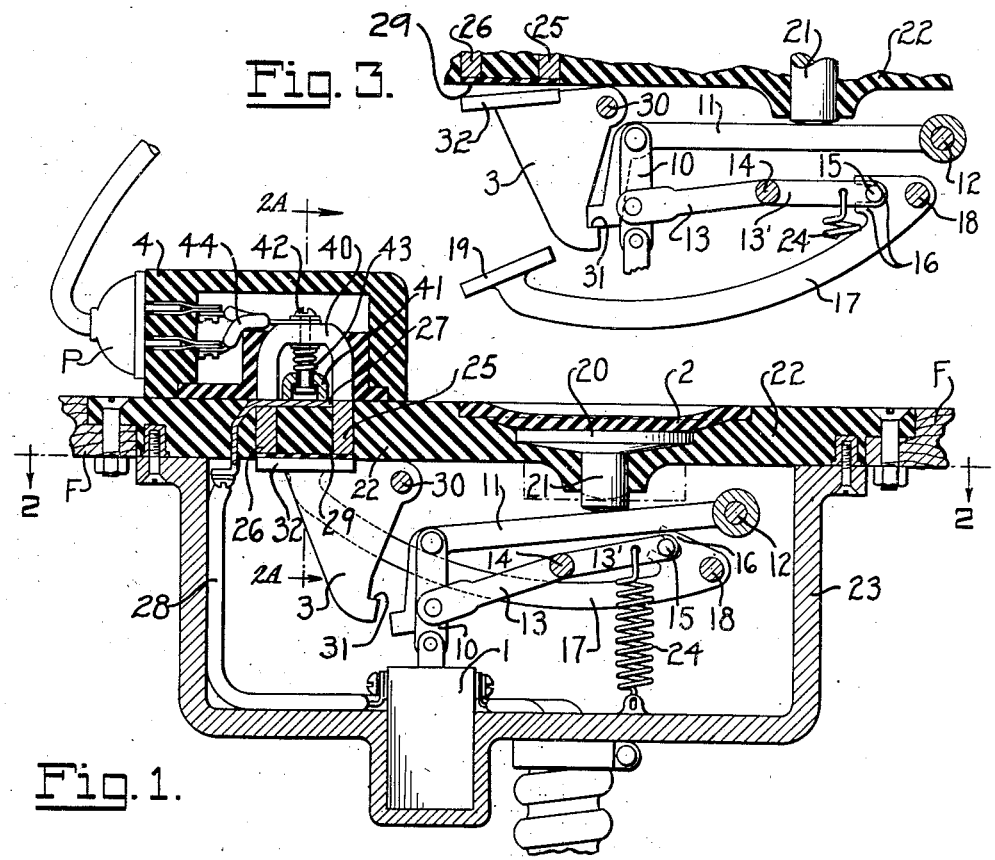
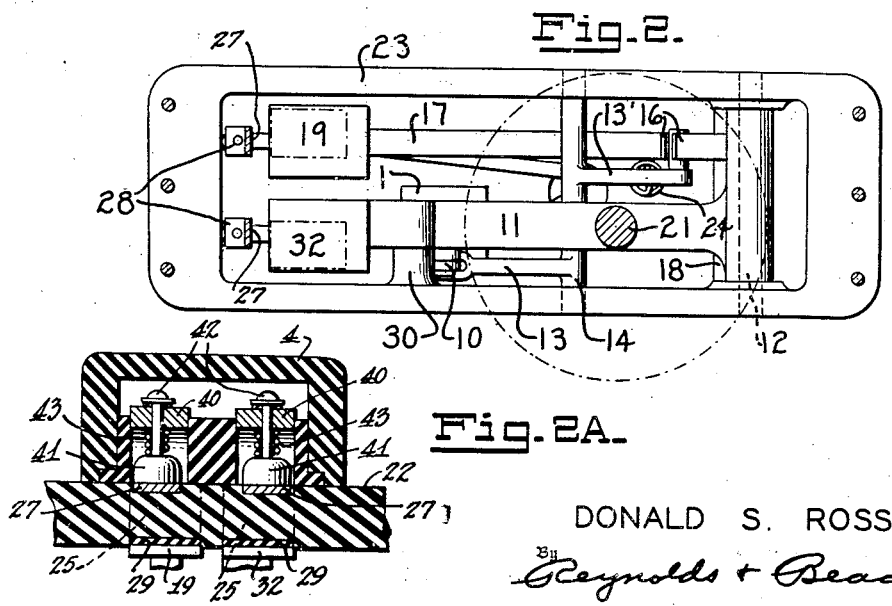
Inventor
DONALD S. ROSS
By Reynolds & Beach
Attorney Oct. 13, 1942.   D. S. ROSS   2,298,313
CONTROLLABLE FLUSH ELECTRIC OUTLET
Filed March 1, 1941   4 Sheets-Sheet 2
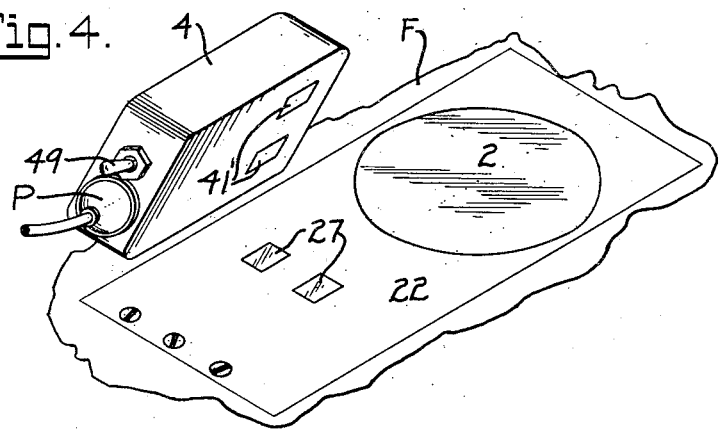
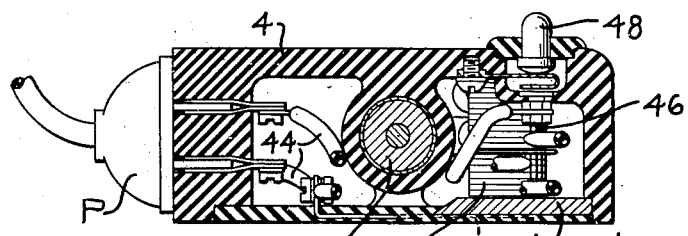
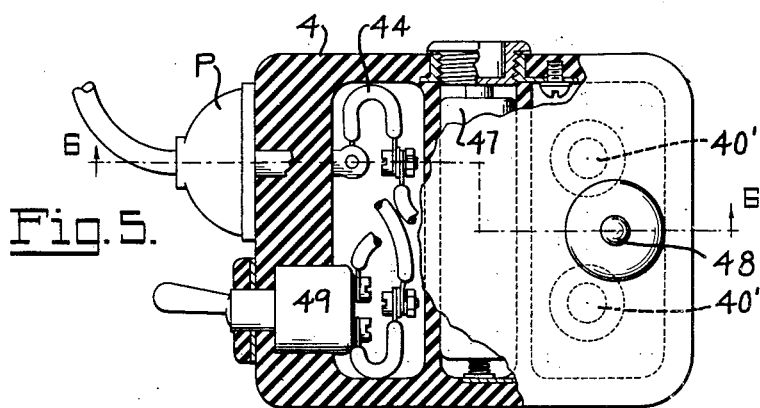
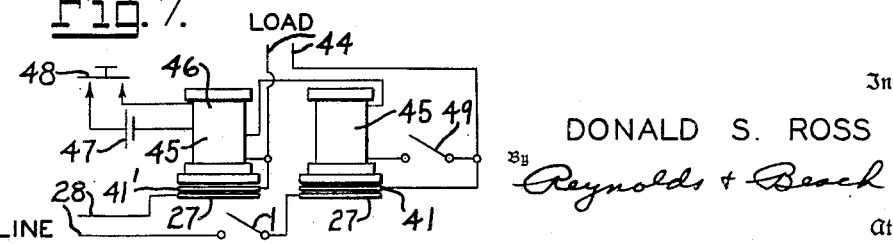
Inventor
DONALD S. ROSS
By Reynolds + Beach
Attorney Oct. 13, 1942.　　　　D. S. ROSS　　　　2,298,313
CONTROLLABLE FLUSH ELECTRIC OUTLET
Filed March 1, 1941　　　　4 Sheets-Sheet 3
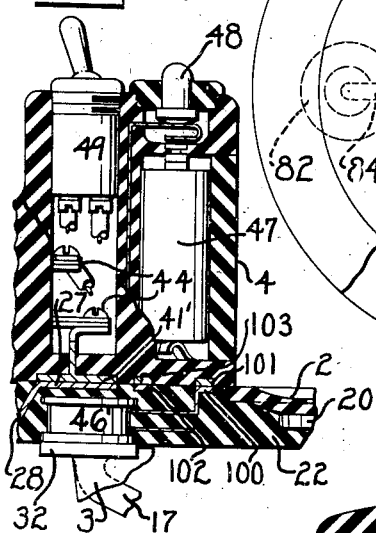
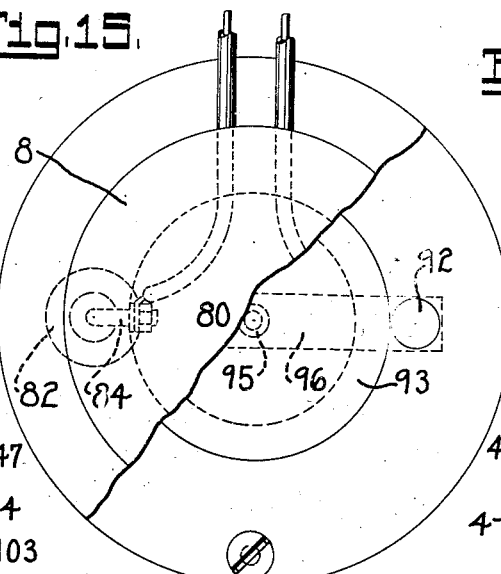
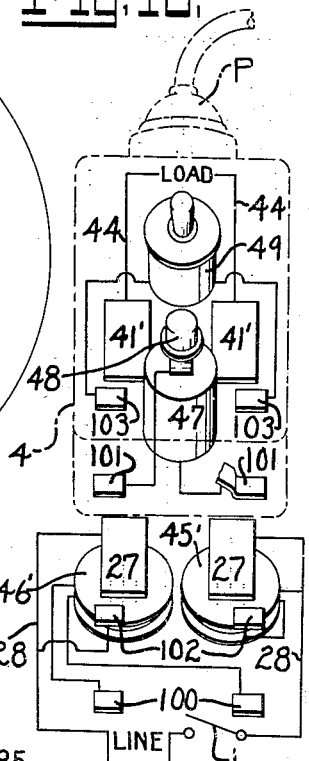
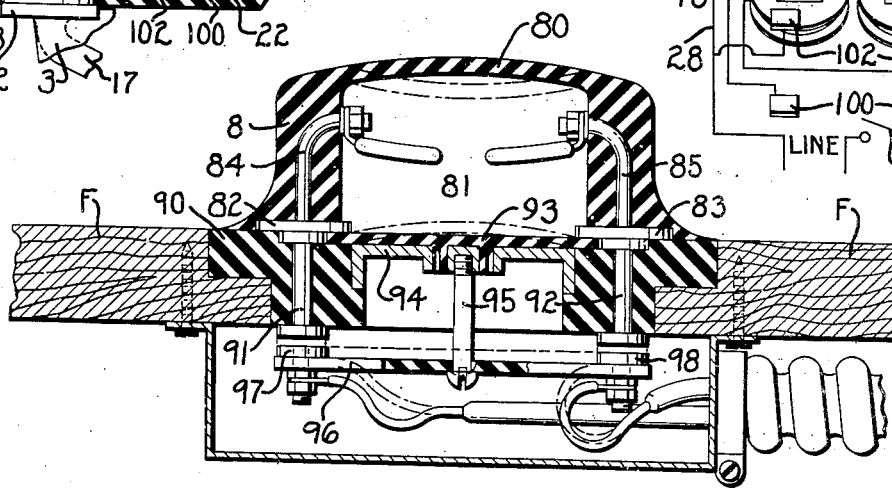
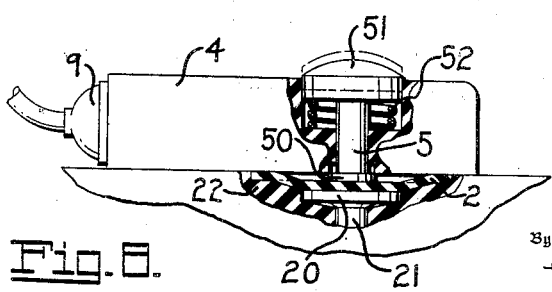
Inventor
DONALD S. ROSS
By Reynolds & Beach
Attorney Oct. 13, 1942.   D. S. ROSS   2,298,313
CONTROLLABLE FLUSH ELECTRIC OUTLET
Filed March 1, 1941   4 Sheets-Sheet 4
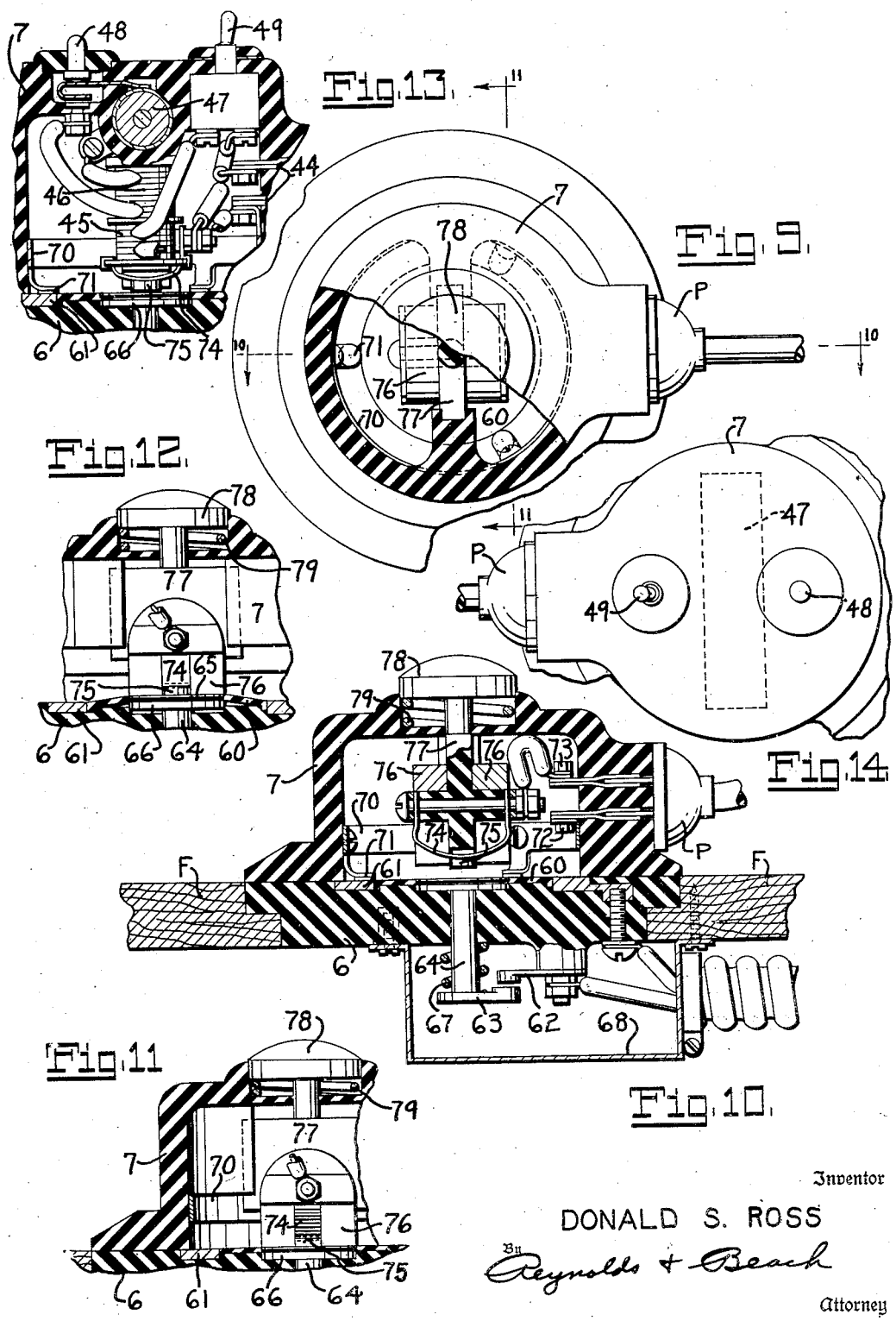
Inventor
DONALD S. ROSS
By Reynolds & Beach
Attorney Patented Oct. 13, 1942

2,298,313

UNITED STATES PATENT OFFICE 2,298,313

CONTROLLABLE FLUSH ELECTRIC OUTLET

Donald S. Ross, Moclips, Wash.

Application March 1, 1941, Serial No. 381,329

22 Claims. (Cl. 200—51)

This application is a continuation in part of my Patent No. 2,234,982, issued March 18, 1941, for Flush floor electric outlets. The invention concerns generally outlets which have no projecting parts or recesses but in which, when inoperative, the exposed parts lie flush with the floor, so that the outlet mechanism will be protected from dirt and other foreign material. The electric outlet to which my invention disclosed herein relates particularly is one in which operation of a switch controlling energization of the outlet is effected by movement of an exposed element, such as a diaphragm or equivalent member, flush with the floor when in inoperative position. Preferably switch closing movement of such element is independent of the act of placing the outlet block upon the floor unit, so that it may be operated at any time thereafter. Movement of the switch to energize exposed electric terminals prior to the block being placed over such terminals is prevented by incorporating suitable locking mechanism for the switch, and the switch will return to "off" position as soon as the block is removed, if it was not in this position prior to such removal.

Another feature of my present invention is the provision of such an exposed switch actuating element which may be moved either mechanically by direct contact, such as with the hand or foot, or by suitable mechanism provided in the outlet block. In the former type such element would not be covered by the outlet block. Furthermore, the switch control mechanism may be constructed for operation either to effect sustained energization of the outlet, or it may function to operate the switch as a momentary contact or push button type.

While such a switch controlled outlet has perhaps its greatest utility when used in the floor because it is not recessed and does not project when not in use, nevertheless it can be used on a wall or ceiling if provision is made to retain the outlet block in place. The preferred type of operating mechanism includes a diaphragm flush with the floor or wall surface when in inoperative position, preferably having a sealed joint with the floor, and which can be moved to actuate suitable mechanism for operating the switch. This diaphragm may be pressed downward by direct contact, or by an operating member mounted on and extending through the outlet block. If a different type of switch operating mechanism is used the diaphragm may be raised or deflected upward from its flush position by mechanism carried by the outlet block, which may operate either magnetically, pneumatically such as by the creation of a partial vacuum above it, or even by mechanical engagement.

When the contact block is not in place some provision should be made for preventing operation of the switch by inadvertent loading of the diaphragm. If the diaphragm is of the type which must be lifted or deflected upwardly it may merely be rigidly supported against downward deflection. If depression of the diaphragm is required to operate the switch, then, when the contact block is not in place over the floor unit, locking mechanism should be operative which will prevent downward movement of the diaphragm under a load. For switch operating movement of the diaphragm such locking mechanism can be automatically released merely by putting the outlet block in place. A magnet, for example, either of the permanent or electric type, may be employed to release the diaphragm lock, or a suction device may be adapted for this purpose.

By the provision of switch operating mechanism contemplated by the present invention, it will be seen that the outlet terminals are preferably not automatically energized by application of the outlet block, as in the invention claimed in my aforementioned application. When energization of the outlet is required, the switch may be closed so that it will remain closed until the outlet block is removed, or provision may be made for release of the switch prior to removal of the block either by relieving the actuating force upon the diaphragm or by discontinuing a holding force acting on it.

To illustrate the principles of my invention, several practical forms of outlet have been shown in the drawings.

Figure 1 is a vertical section through a floor unit and outlet block installation with the block contacts in engagement with the floor unit terminals, while Figure 2 is a plan view of the floor unit switch controlling mechanism taken along line 2—2 of Figure 1, showing parts in section. Figure 2A is a detail section on line 2A—2A of Figure 1. Figure 3 is a vertical section similar to Figure 1 through the floor unit, but showing parts in a different position.

Figure 4 is a top perspective view of the floor unit, showing in bottom perspective a different form of outlet block. Figure 5 is a plan view of the block shown in Figure 4, with parts broken away, while Figure 6 is a vertical section through this block on line 6—6 of Figure 5. Figure 7 is a schematic diagram of the electromagnetic mechanism within the block.

Figure 8 is a side elevation view, showing parts broken away, of still a different outlet block and switch operating mechanism, having features which may be incorporated in a block of the type in Figure 1, or that in Figures 4, 5, and 6, for examples.

Figure 9 is a plan view with parts broken away, and Figure 10 is a vertical section along line 10—10 of Figure 9 of another type of outlet block and switch control mechanism. Figure 11 is a further vertical section taken at right angles to Figure 10 along line 11—11 of Figure 9, while Figure 12 is a similar vertical section showing parts in a different position.

Figure 13 is a vertical section through a somewhat similar, magnetic type of outlet block which may be used with the same floor unit as shown in Figures 9 and 10, and Figure 14 is a plan view of such block.

Figure 15 is a plan view, with parts broken away, and Figure 16 is a vertical section through still a further modification of outlet block and switch control mechanism.

Figure 17 is a vertical section, parts being broken away, of another type of outlet block and armature retaining magnet arrangement which may be used with the switch operating mechanism of Figure 1, and Figure 18 is a diagrammatic top perspective view showing the operating mechanism and connections, with the block outline in phantom, showing the block in registry with but raised above its operative position.

In the following description of the several embodiments of my invention, where reference is made to mounting of elements in or flush with the floor, it will be understood that such term includes any exposed surface, such as a wall or even a ceiling, although ordinarily my outlet would be mounted in the floor, for which use it is particularly adapted.

In switch operating mechanism actuated by a depressible diaphragm various types of contact block may be used with the same floor unit including a diaphragm, switch operating mechanism, and a latch or lock for such operating mechanism. Thus while Figure 1 shows one type of contact block, Figures 4 to 7 show another type, and Figure 8 shows still a further type, the floor unit of Figures 1 to 4 inclusive and Figures 7 and 8 would be the same in each case.

In Figures 1, 2, and 3, a suitable type of operating mechanism is illustrated. To the switch 1 is connected one end of a link 10, the other end of which is connected to the swinging end of a lever 11, pivotally mounted upon a fixed shaft 12. This is the primary actuating lever, which is swung on its pivot axis by downward pressure on diaphragm 2 acting through a supporting platform 20 and rod 21, the latter being engaged with the upper side of lever 11 between shaft 12 and link 10, so that the switch may be operated by a relatively small movement of the diaphragm. When the switch is "off" the diaphragm lies flush with the adjacent floor, and preferably is sealed around its edges to prevent entrance of dirt and foreign matter beneath it.

In order to prevent inadvertent operation of switch 1 by a load on diaphragm 2 when the outlet block 4 is not in place, a latch or locking member 3, swingable about a fixed pivot pin 30, may be provided, which is of generally quadrant shape. The lower end of this latch has a notch 31 into which the depending end of lever 11 fits, as shown in Figure 3. The upper end of the latch carries a plate 32 of iron or other material which may be attracted by a magnet. When the contact block 4 is not in place the parts assume the position shown in Figure 3, in which rod 21 is in raised position, and lever 11 is held in its upper position by engagement in notch 31 of the latch. In order to release the lever for operation by the diaphragm the quadrant latch must be swung in a clockwise direction to withdraw the notch from the lever end. The mechanism for effecting this operation will be described in detail later. Upon such movement of the latch to the released position of Figure 1 the diaphragm may be pressed downward to swing lever 11 so that link 10 will be reciprocated downward to operate the switch, which is of any suitable, conventional construction.

When the diaphragm is released the mechanism described may be returned to its upper position by the spring of the switch if it is sufficiently strong. I prefer, however, to include special return spring mechanism which may react from the casing of the outlet unit mounted in the floor F, which includes the floor plate 22 of insulating material, and the box 23 supported beneath it. It will be noted that the entire floor unit may be carried by the floor plate so that the unit may be assembled before being mounted in the floor and may be secured in place merely by anchoring the plate. Thus the return spring 24 may have one end connected to the box 23, and the other end secured to the end of a lever arm 13' which is integral with a pivot rod 14, a second integral lever arm 13 being pinned to link 10. As lever 11 is swung downward, therefore, arm 13 will be depressed, arm 13' will be raised correspondingly, and spring 24 will be tensioned, so that upon release of pressure on diaphragm 2 the spring will return the switch, lever 11, rod 21, and diaphragm 2 to their upper positions, whether or not switch 1 incorporates a return spring. The lower end of lever 11 would then again be in position to be engaged by notch 31 of lever 3, if the latter should be released to swing in a counterclockwise direction.

In order to control operation of latch 3, and further to hold switch 1 in closed position without requiring continued pressure on diaphragm 2, special operating mechanism may be incorporated within contact block 4, and, as shown in Figure 1, one or more permanent magnets may be utilized for this purpose. Through the floor plate 22 extend iron pieces 25 and 26 which serve as pole extensions for the outlet block magnet 40 of the horseshoe type. These pole pieces are spaced apart sufficiently to prevent any very serious flux leakage between them. If only momentary contact operation of switch 1 is desired, then merely a single magnet 40 would be provided, which releases the notch of latch 3 from the end of lever 11 whenever the block is applied. The extension pole pieces 25 and 26 generally coincide with the location of the electrical terminals 27. These terminals are connected by wires 28 to the current source, at least one of such wires being controlled by the switch 1. Conduction from the terminals 27 to the armatures 19 and 32, although they may be in contact with pole pieces 25 and 26 is prevented by the interposition of thin sheets of insulating material 29 beneath such pole pieces. No magnetic flux leakage, of course, occurs through contacts 27 because they are of electrical conducting, non-magnetic metal, such as brass or copper. Further, because the armature does not touch the extension pole pieces 25 and 26, no residual magnetism can retain the armature in raised position after these pole pieces are demagnetized.

Preferably the upper sides of terminals 27 lie flush with the surrounding floor surface and are exposed as shown in Figure 4, when not covered by the outlet block, to afford direct contact with cooperating contacts in the block. An inductive system may, however, be employed as an alternative, such as by providing a primary winding in the floor unit which will energize a secondary winding in the outlet block. It is convenient to support the contact members in block 4 from the permanent magnets 40, if two of these are used. A contact button 41 may be positioned between the poles of each such magnet 40. This button is recessed and apertured to receive an upset end or a nut of bolt 42, which bolt extends through and is supported from the magnet bar between its pole ends. Sufficient clearance between button 41 and the bolt 42 is left so that the button may adjust itself to seat squarely upon the floor terminal to establish good contact with it. Between the button and the magnet may be provided a spring 43 surrounding the bolt, which urges the button firmly downward into engagement with the terminal plate 27 and affords a reliable electrical path between the bottom and bolt. Wires 44 connected to the bolt 42 carry the current to a conventional outlet jack and plug P on the side of the block. The plug may thus be removed and replaced or another connected without removing or in any way disturbing the block when in operative position.

The latch may be held in the position of Figure 1 by the attraction of magnet 40 so that the switch 1 may be depressed into terminal energizing position by pressure on diaphragm 2. While this has been illustrated as being depressable in the center it might be constructed to move bodily downward, or it might have several depressible or bodily movable portions which would be operated in synchronism. Any such operation is intended to be covered by reference to depressing the diaphragm and any such structure is included within the term "depressible diaphragm." The current may then pass through wires 28 and terminals 27 upward through buttons 41 and bolts 42 to the wires 44 for energizing the conventional outlet in the side of the block. Such a jack and plug might, of course, be located in the top instead of on the side of the block, and in fact wires of the outlet cord could be connected directly to bolts 42 instead of the current passing through such an outlet jack and plug. The arrangement shown is merely for convenience, since it is adapted to receive plugs now in use without modification.

If it is desired to retain the switch in terminal energizing position without requiring maintenance of pressure on diaphragm 2, an additional pin 15 may be provided on the return spring arm 13', to fit into a bifurcated tab or yoke 16 near the end of a lever 17 which is pivoted upon a shaft 18 to swing about a fixed axis. The swinging end of this lever carries a magnet armature 19 which is movable in a generally vertical path into a position alongside armature 32, to be held by a second magnet 40 mounted in outlet block 4. For this magnet also a second set of extension pole pieces 25 and 26 extending through the floor is provided. The limiting positions of swing of lever 17, as shown in Figures 1 and 3, are determined by the movement of switch 1, to which arm 13 is connected through link 10. As the diaphragm plunger rod 21 is moved downward from the position of Figure 3, arm 13' will be swung upward, not only to tension spring 24, but also to raise armature 19, because of the engagement of pin 15 in yoke 16. When thus raised into the position of Figure 1 this armature may be retained by the second magnet 40, so that arm 13' will be held in its upper position after pressure on the diaphragm is released, preventing return of the switch and its operating linkage by the spring 24. The switch will thus be held closed until the outlet block is removed from registry with the floor unit to release armature 19. Deenergization of the outlet may be accomplished, instead of by such block removal, by any other expedient for destroying the magnetic attraction, such as by changing the position of the magnet within the block or by placing a second armature across its poles.

Instead of providing a second magnet to hold armature 19 a single magnet may be employed, one pole of which may attract the latch armature and the other one attract the hold armature. Alternatively a single small magnet may be positioned initially to release latch 3. After depression of diaphragm 2 so that the latch may not reengage the swinging end of lever 11 immediately, the magnet may be utilized to retain armature 19 in its upper position either by shifting the magnet across the block, such as by swinging or sliding it, or by bodily movement of the block itself provided such movement leaves or places block contact elements 41 in engagement with terminals 27. It will be understood that in either such case the principle of operation will be the same, and the details may be altered to suit the requirements of the particular installation contemplated. In fact suitable pneumatic suction means may be substituted for magnetic control to release the catch or to hold the switch closed, if desired. Furthermore it is not necessary that the terminals 27 or armatures 19 and 32 be adjacent each other, although this is a convenient arrangement for compactness of the floor unit and for minimum size of the contact block 4. If these considerations are not important levers 11 and 17 may even be mounted to swing upon mutually perpendicular axes, instead of parallel axes as illustrated. It will be noted that the various pivot rods are mounted in and extend between the sides of case 23 except for shaft 30, which is shown to be of the cantilever type, although it also might extend completely across the case.

In the form thus far described the outlet block 4 is only large enough to cover the zone of terminals 27, leaving diaphragm 2 exposed for direct contact by the foot. Indirect depressing mechanism, such as shown in Figure 8, may, however, be employed, in which a shaft 5 is guided for lengthwise reciprocation in block 4. This shaft is located so that when the block is in proper position for its contacts to engage terminals 27 this shaft will be disposed centrally above diaphragm 2. A head 50 on the shaft may be provided to distribute the force over a larger area of the diaphragm. If, as previously suggested, several portions of the diaphragm were depressible, the lower end of shaft 5 would be constructed to depress all these simultaneously. Pressure may be applied to a button 51 carried by its upper end, and a spring 52 may be provided beneath this button to react from the block for returning the rod to its upper position upon release of pressure against the button. It will be understood that such an outlet block may be substituted for the one shown in Figure 1 without any change whatever being required in the switch operating mechanism mounted upon and suspended from floor plate 22.

The contact block of Figures 4 to 7, inclusive, may also be used interchangeably with the blocks of Figures 1 and 8, and differs from these in utilizing electromagnets instead of permanent magnets for attracting armatures 19 and 32, or the latter alone. The contacts 41', instead of being supported from the magnets 40', are merely embedded beneath them, and, as in the other forms, may be connected by wires 44 to a conventional outlet jack. The strip supporting one end of such a contact may be slightly resilient to urge the contact toward its terminal 27 for good conduction. The electromagnet core need not be of U-shape, but, as shown in Figure 6, is preferably sufficiently wide to span between extension pieces 25 and 26 mounted in the floor plate 22. Even the permanent magnet type may require only a single pole if sufficiently strong.

When this type of outlet block is first put in place the switch 1 is in a position such that the terminals 27 are not energized, and hence are not available as a source of electric power. After the switch has been actuated to energize these terminals they may be used as a source of current to keep energized magnet coils 45, one for the latch release magnet and the other for the switch holding magnet, by connecting them in parallel with the load, in the manner shown in Figure 7. In order to release latch 3, however, a separate winding 46 is provided on the latch release magnet, which may be energized by a battery 47 contained in the outlet block. A switch 48, of the momentary contact type, mounted on top of the block, may be depressed to energize winding 46 by electricity from battery 47, to release the latch. As soon as the diaphragm 2 is depressed closing switch 1, terminals 27 will be energized, and in turn power will be available to outlet block contacts 41. Assuming that switch 49 is closed, windings 45 of both magnets will be energized, and the latch will be held retracted by energization of coil 45 on the latch release magnet. This winding 45 of the latch release magnet might even be omitted for the latch is also mechanically interdicted from returning to locking position while switch 1 is closed. If the latch is released after the end of lever 11 has moved below notch 31, the latch tip will strike the end of lever 11 and its notch cannot reengage such lever end until after it has again been raised, by which movement the switch 1 would be returned to "off" position. Breaking of the switch 1 would effect movement of the latch to locking position even if coil 45 is provided, for the latch release magnet would be deenergized because the circuit through its winding 45 would thus also be broken.

Assuming that the load is to be operated continuously after contact has once been made, switch 49 will remain closed so that the winding 45 of the electromagnet controlling armature 19 will be energized by current from terminals 27. Attraction of the armature will hold switch 1 in terminal energizing position. If, however, it is desired to operate the load intermittently, then switch 49 may be broken, in which case spring 24 will return the switch to "off" position each time pressure upon diaphragm 2 is released. The latch 3 will thereupon reengage lever 11, so that it will be necessary again to press button 48 to retract the latch before the diaphragm may be operated to reclose the switch. Furthermore, if the load is to be operated continuously for long periods, it is not necessary to remove this type of outlet block in opposition to the force of its magnets in order to release the switch at the end of the operation. In such case switch 49 may be turned to "off" position, which will destroy the attractive force on armature 19, and permit return of the switch operating mechanism by spring 24 and easy removal of the block.

Perhaps the most desirable arrangement is a combination of the permanent magnet and electromagnetic types, which does not require both the operation of a switch and a diaphragm to close switch 1, but has the advantages of compactness of the permanent magnet form, being deenergizable merely by throwing a switch instead of requiring physical displacement or manipulation of the magnet, and permitting operation of switch 1 either for momentary contact or for sustained operation. Such combination would employ a permanent magnet as in Figure 1 in position to attract latch armature 32, and an electromagnet to control switch-holding armature 19 connected as shown in Figure 7, in conjunction with switch 49. Whenever such an outlet block is applied to the floor unit the latch 3 will be retracted immediately and automatically by action of the permanent magnet. As long as switch 49 is left open switch 1 can be operated as a momentary contact switch by manipulation of diaphragm 2. If switch 49 is closed, however, armature 19 will be attracted and held raised by the electromagnet energized upon closing of switch 1, and the terminals 27 will remain energized until switch 49 is again broken or the block removed.

In the modified form of outlet shown in Figures 9 to 12, inclusive, permanent magnets are illustrated, although an electromagnet, as shown in Figures 13 and 14, may be employed. The general arrangement of both the outlet block and the floor mounted mechanism is considerably different, although the same principle of operation is utilized. In this instance, however, the diaphragm, instead of being pressed downward, is raised in order to actuate the power control switch. Because the diaphragm is backed solidly from below there is no danger of moving it inadvertently to actuate the switch, so that no latch or locking mechanism is required.

It should be noted that while diaphragm 60 is shown to be constructed of rubber sealed around its edges, this member might be omitted, plates 65 and 66 alone being provided, which would be retracted by spring 67 into a floor recess so that in inoperative position the upper plate would be flush with the floor surface. With such an arrangement, however, there is a possibility of dirt working under the armature 66, so that eventually rod 64 would not be retracted sufficiently to bring the upper plate down flush with the floor surface. For that reason the seal provided by the rubber diaphragm 60 is preferred. Where such a unit is mounted in a wall or on the ceiling, for example, the diaphragm 60 becomes of considerably less importance, and may be omitted with little risk of dirt collecting behind the magnet armature. The plates 65 and 66 in such a construction are intended to be embraced within the term "diaphragm."

As before, a floor plate 6 is provided, on which the switch and switch operating mechanism are mounted. The diaphragm 60 overlying the central portion of the mounting plate is encircled by an electric terminal ring 61. This ring may be permanently connected to one lead of the electrical circuit, and the other lead may be connected to a fixed switch point 62 which is supported from plate 6. The other switch point 63 is carried by the lower end of a vertically reciprocable rod 64, which is secured to an electric terminal plate 65 mounted in the center of diaphragm 60. Beneath this terminal plate is a magnet armature 66 of suitable material, such as iron, which the magnet of the outlet block may attract to operate the switch. Normally the rod 64 is retained in its lower position by a spring 67 which acts to hold the switch points 62 and 63 out of contact. The switch mechanism is enclosed by a box or case 68. While only a single lead is shown as being controlled by the switch points 62 and 63, additional switch points may be mounted on rod 64 to break positively the other lead as well, if desired.

The outlet block 7 has a band 70 about its periphery which is provided with contact feet 71 arranged to engage the terminal ring 61, when the outlet block is centered over the diaphragm 60. To this ring 70 is connected one terminal 72 of an outlet jack adapted to receive a conventional plug. The other jack terminal 73 is connected to a bolt which carries a spring strap 74 passing between the legs of magnets 76 and supporting a contact button 75 disposed concentrically of the block, and immediately above terminal plate 65 when the block is in proper registry over the floor unit.

In order to establish contact between button 75 and plate 65, and to close switch points 62 and 63, permanent magnets 76 are supported for vertical movement with a support 77 and are arranged symmetrically on opposite sides of it. This support is preferably molded from insulating material and its opposite edges project laterally into guide grooves provided in block 7, as shown in Figure 9, to guide it for reciprocation. The upper end of support 77 is cylindrical, and passes through an aperture in the top of the block. On the upper end of this support is a button 78, beneath which is a spring 79 encircling the cylindrical portion of the support and received in a recess in the top of the block.

When the block is first placed in registry over the diaphragm 60 the contact feet 71 immediately engage ring 61, which is flush with the floor surface. These feet are sufficiently resilient to afford good contact with the ring. No engagement occurs initially between button 75 and the central terminal plate 65, however, since spring 79, pressing upward against button 78, will hold the magnets 76 and contact button elevated in the position shown in Figure 10. In order to complete a circuit for energization of the plug P, therefore, button 78 must be pressed downward into the position shown in Figure 11. By this action contact button 75 is pressed firmly against terminal plate 65, and the spring strap 74 will yield upwardly so that the lower ends of magnets 76 also come into contact with plate 65. When button 78 is released spring 79 tends to return the parts to the position of Figure 10, but because of armature 66 being attracted by magnets 76 contact between button 75 and plate 65 will be retained, as shown in Figure 12, and the center of diaphragm 60 will be deflected upwardly to draw contact point 63 into engagement with point 62. With the parts in this position the plug P will be kept energized indefinitely, the switch 62, 63 remaining closed and button 75 in contact with plate 65, until block 7 is physically removed from registry with the floor unit, or button 78 again depressed to open points 62, 63. If the block is removed with the switch thus broken arcing between the contacts will be prevented.

If an electromagnet is substituted for the permanent magnets 76, as shown in Figures 13 and 14, two electric windings 45 and 46 should be provided, as shown at the left of Figure 7, and the same control switches should be employed. The second magnet of Figure 7 is not necessary because only a single magnet armature is provided in the floor unit structure of Figures 9 to 14. Because the magnet and its controls of Figures 13 and 14 are the same as shown in Figure 7 the same numerals have been applied to corresponding parts. The only difference in this embodiment lies in the incorporation of the elements within a circular block 7, instead of in a rectangular block such as shown in Figures 5 and 6, but the disposition of the elements, with the exception of the magnet, is immaterial. For convenience the core of the magnet may be slotted to receive the spring strap 74 carrying contact button 75, the same as in Figure 10.

In this electromagnet outlet block it is not necessary that the magnet be movably mounted to secure the same type of operation as with the block of Figure 10, but it may be secured permanently in a position corresponding to that assumed by the permanent magnet in Figure 12. When the outlet block is placed over the floor unit, as before, the contact feet 71 will engage electric terminal ring 61. Again contact button 75 will not be in engagement with plate 65 for the electromagnet is not energized and the floor unit switch is, of course, in the "off" position. When switch button 48 is pressed coil 46 will be energized by means of the battery 47, and the armature 66 will be attracted to press plate 65 firmly against contact button 75. The circuit to plug P will now be closed, because of the contact between feet 71 and ring 61, button 75 and plate 65, and contact points 62 and 63 effected by such lifting of the diaphragm. If switch 49 is left in the "off" position switch 48 will control power switch 62, 63 as a momentary contact type, the latter being closed as long, and only as long, as switch 48 is held closed. If switch 49 is in the "on" position, however, the magnetic coil 45, connected in parallel with the load, will be energized, so that even if button 48 is released the diaphragm will be retained in its raised position to hold switch points 62, 63 closed. When it is desired to deenergize the circuit it is not necessary to remove the block 7 from its position in registry with the floor unit, but merely to place switch 49 in the "off" position, whereupon magnetic coil 45 will be deenergized and diaphragm 60 will be drawn downward by spring 67, which will separate contact points 62 and 63, and also depress plate 65 from contact with button 75. The block 7 may now be removed without the possibility of arcing between the floor terminals and block contacts or having to overcome the resistance of magnetic attraction. Such attraction would usually be greater than in the types of Figures 1 to 8 where the switch is operated by direct pressure upon the diaphragm rather than by magnetic attraction.

Even a permanent magnet thus held stationary in block 7 could be used to raise diaphragm 60 if its poles were not too far from plate 66 and spring 67 were not too strong. In such case, however, the diaphragm would be lifted automatically as soon as the block was applied, and it would be necessary to lift the block off against the magnetic attraction to disengage switch points 62, 63 for deenergizing the outlet. Momentary contact operation of the switch would not be possible. In some instances it may even be preferable to employ an actual mechanical grip upon the diaphragm 60 to raise it into switch closing position, but ordinarily this would not be desirable for such mechanism would require a diaphragm having either a socket or a projection to serve as part of a mechanical lifting interlock, which would interrupt the smooth floor surface. Or, if sharp lifting claws depressed rubber in diaphragm 60 in order to grasp plate 65, smoothness of the grit-excluding surface would eventually suffer.

In Figures 15 and 16 the same general type of floor unit is employed as in Figures 9 to 14, inclusive, except that here both terminals of the outlet circuit are switch controlled. Instead of using magnetic attraction to close this switch a suction force is created by the contact block 8 to raise the diaphragm. The filler plate 90 in this instance is provided with a central aperture closed by a flexible diaphragm 93, supported from below by a plate 94. The flexible diaphragm 93 may be of rubber, for instance, so that it will distend but will return to its normal, flat position. It is suitably clamped and held in place, and normally forms a smooth, flush continuation of the floor surface, but may be flexed upwardly, as is indicated in dash lines, if acted on by suction, upwardly directed. To it, by a pin 95, is connected a bar 96 of insulating material, which carries the electric terminals 97 and 98. No magnetic terminals are required, merely the electrical conductors 91 and 92. The housing 8 in this instance is formed with a flexible wall, indicated at 80, and encloses a chamber 81 of appreciable volume.

When the housing 8 is removed there is no force to pull upwardly the flexible diaphragm 93, and consequently the bar 96 with its contacts 97 and 98. The flexible diaphragm 93 therefore falls to its full-line position, where it is supported by the plate 94. When the casing 8 is put in place, however, and its flexible wall 80 is pushed inwardly, air is expelled from the chamber 81, about the margin of the casing, and since the margin of the casing fits closely down to the surface of the filter plate 90, air may not reenter the chamber 81, but upon release of pressure from the wall 80 the latter, by its own inherent stiffness, tends to restore itself from the dash-line position to the full-line position. Spring means or other assisting means may be employed to insure that this takes place, if desired or necessary. Upon restoration of the shape of the casing 8 the partial vacuum within the chamber 81 enables the higher atmospheric pressure below the flexible diaphragm 93 to force it upwardly, thereby drawing upwardly the bar 96 and making contact between the electric terminals 97 and 98 and the electric conductors 91 and 92. Again, as in other instances, the electrical connection is broken merely by removal of the casing 8. While a deformable wall 80 has been illustrated as the means for partially exhausting chamber 81 this might instead be connected to a vacuum pump or other evacuating mechanism. Upon placing the block 8 in proper position, as shown, and depressing and releasing wall 80 diaphragm 93 is lifted, thereby closing the electric circuit from the lead-in wires through the flexible leads, through the terminals 97 and 98, thence through the conductors 91 and 92, the terminals 82 and 83, the leads 84 and 85, to the outlet wires. Now any suitable load may be connected to and disconnected from these wires in the normal way, and to all intents and purposes the floor outlet, though flush and dead when not in use, becomes the full equivalent of a normal convenience outlet.

In Figures 17 and 18 a further type of electromagnetic arrangement is shown, in which the magnets 45' and 46', instead of being carried by the outlet block, as in the form of Figures 4, 5, and 6, are mounted in the floor unit. The block may thus be made much more compact. The switch-operating mechanism may be the same as that shown in Figures 1, 2, and 3, the only difference in the floor unit being that the electromagnets 45' and 46' replace the magnet extension pieces 25 and 26.

In this form of my device the block, as before, will carry a small battery, such as a flashlight cell, 47, which may be operated to energize a magnetic coil 46' to release a holding catch 3 by attracting its armature 32. Since the magnet 46' is in this instance located in the floor unit, such unit is provided with small electric terminals 100, which will register with and engage complemental contacts 101 on the lower surface of the block. These latter contacts may be resiliently mounted in the block in any suitable manner to afford more positive engagement, if this should be desirable.

After the switch 48 has been closed, when the block is in proper registry with the floor unit, the magnet 46' will be energized to attract armature 32 and release catch 3. The diaphragm 2 may now be pressed to move the plunger 20 downward for actuating the switch. Simultaneously arm 17 carrying the holding armature 19 will be raised into close proximity to the holding magnet 45'. If the switch 49 is in the "on" position this magnet will be energized to retain switch 1 closed by attraction of armature 19, since current will flow from a wire 28 through floor terminals 102 and block contacts 103, which are connected in series with the switch 49, as shown in Figure 18. As long as the circuit is completed through switch 49 magnet 45' will remain energized to hold the switch closed. If switch 49 is moved to the "off" position or the block is physically removed so that contacts 103 no longer engage terminals 102, the circuit will be broken and magnet 45' deenergized to release switch 1. The latch 3, no longer being held in released position by energization of magnetic coil 46', will then retain the switch in "off" position until the catch is released and diaphragm 2 again depressed. As in the block of Figures 4, 5, and 6, contacts 41' connected by wires 44 to the jack for receiving plug P are located in the lower face of the contact block 4 in proper position for registry with floor terminals 27. The plug jack will thus be energized as long as the switch 1 remains closed and the block in place on the floor unit, whether or not the plug P is inserted in the jack.

What I claim as my invention is:

1. An electric outlet comprising a face plate, supply wires behind said face plate for connection to a power source, an outlet block positioned over said face plate and carrying distribution wires adapted for connection to a power load, means for transmitting power from said supply wires to said distribution wires, means behind the face plate constituting a normally open electric switch, and when closed energizing said power transmitting means, and switch operating means behind the face plate movable to close said switch and including a diaphragm in inoperative position substantially flush with the outer surface of said face plate and movable to close said switch.

2. An electric outlet comprising electric terminals substantially flush with a floor surface, switch means disposed below the floor surface and operable to energize said terminals, an outlet block having contacts engageable with said electric terminals and in registry therewith, and manually controlled means carried by said block, operable to hold said switch means in closed position for energizing said terminals.

3. An electric outlet comprising a face plate, supply wires behind said face plate for connection to a power source, an outlet block positioned over said face plate and carrying distribution wires adapted for connection to a power load, means for transmitting power from said supply wires to said distribution wires, means behind the face plate constituting a normally open electric switch, and when closed energizing said power transmitting means, switch operating means behind the face plate including a member in inoperative position substantially flush with the outer surface of the face plate, and movable to actuate said switch operating means to close said switch, and control means operable to retain said switch operating means in position corresponding to closed position of said switch.

4. The electric outlet of claim 3, the control means being on the outlet block and operable to effect movement of the member flush with the outer surface of the face plate for actuating the switch operating means to close the switch.

5. The electric outlet of claim 3, and a manual operating element mounted in exposed position on the outlet block and operable to effect movement of the member flush with the outer surface of the face plate after disposition of the block over the switch operating means, to actuate such means for closing the switch.

6. An electric outlet, comprising electric terminals substantially flush with a floor surface, switch means below the floor controlling energization of said terminals, an outlet block above the floor having contacts engageable with said electric terminals, and manual operating means for said switch means located adjacent to said electric terminals and operable after disposition of the outlet block over said terminals to move said switch means into terminal energizing position.

7. The electric outlet of claim 6, in which the manual operating means are mounted on the outlet block.

8. The electric outlet of claim 6, and locking means positively restraining movement of the switch means into terminal-energizing position, and means on the outlet block operable to release said locking means for movement of the switch means, but inoperative to effect such movement of the switch means.

9. An electric outlet comprising two electric terminals substantially flush with a floor surface, switch means disposed below the floor surface and operable to energize said terminals, an outlet block adapted for application over said terminals and having contacts engageable therewith, and a diaphragm in inoperative position flush with the floor surface and movable to close said switch means to energize said terminals.

10. An electric outlet comprising two electric terminals substantially flush with a floor surface, switch means disposed below the floor surface and operable to energize said terminals, an outlet block adapted for application over said terminals and having contacts engageable therewith, a diaphragm in inoperative position flush with the floor surface and movable to close said switch means to energize said terminals, and control means carried by said outlet block, operable to retain said switch means in such closed position.

11. An electric outlet comprising a face plate, supply wires behind said face plate for connection to a power source, an outlet block positioned over said face plate and carrying distribution wires adapted for connection to a power load, means for transmitting power from said supply wires to said distribution wires, means behind the face plate constituting a normally open electric switch, and when closed energizing said power transmitting means, switch operating means behind the face plate, a diaphragm in inoperative position substantially flush with the face plate and depressible to actuate said switch operating means for closing said switch, and locking means normally retaining said diaphragm in undeflected position, but releasable for diaphragm depression.

12. Electrical mechanism comprising electrical terminals on a surface, switch operating mechanism on the same surface adjacent to said terminals, switch means mounted behind said surface and controlling energization of said terminals, a catch normally restraining said switch means from movement to terminal energizing position, and magnetic means adapted to be positioned upon said surface and operable to actuate said catch, thus to release it from holding engagement with said switch means.

13. An electric outlet comprising a face plate, supply wires behind said face plate for connection to a power source, an outlet block positioned over said face plate and carrying distribution wires adapted for connection to a power load, means for transmitting power from said supply wires to said distribution wires, means behind the face plate constituting a normally open electric switch, and when closed energizing said power transmitting means, switch operating means behind the face plate, a diaphragm in inoperative position substantially flush with the face plate and depressible to actuate said switch operating means for closing said switch, a latch normally engaging said switch operating means and thereby holding said diaphragm against depression, a magnet armature on said latch disposed immediately beneath said face plate, and a magnet on said outlet block operable to attract said latch armature for moving it to release said switch operating means.

14. The electric outlet of claim 13, the switch operating means including a second magnet armature disposed immediately beneath the face plate when such switch operating means are in position corresponding to closed position of the switch for attraction by a magnet in the outlet block to hold the switch operating means in such position.

15. An electric outlet comprising a face plate, supply wires behind said face plate for connection to a power source, an outlet block positioned over said face plate and carrying distribution wires adapted for connection to a power load, means for transmitting power from said supply wires to said distribution wires, means behind the face plate constituting a normally open electric switch, and when closed energizing said power transmitting means, switch operating means behind the face plate including a diaphragm in inoperative position substantially flush with the face plate, and means supporting the diaphragm for movement into a position protruding beyond the face plate to actuate the switch operating means for closing said switch.

16. An electric outlet comprising a face plate, supply wires behind said face plate for connection to a power source, an outlet block positioned over said face plate and carrying distribution wires adapted for connection to a power load, means for transmitting power from said supply wires to said distribution wires, means behind the face plate constituting a normally open electric switch, and when closed energizing said power transmitting means, switch operating means behind the face plate including a diaphragm in inoperative position substantially flush with the face plate, stationary means rigidly supporting said diaphragm against depression, and means supporting said diaphragm for movement into a position protruding beyond the face plate to actuate said switch operating means for closing said switch.

17. The electric outlet of claim 16, and means carried by the outlet block operable to lift the diaphragm into position for actuating the switch operating means to close the switch.

18. Means to effect an electrical connection through a partition, one side whereof is normally inaccessible, comprising, in combination, electrical terminals accessible from the outer side of the partition, a flexible wall in the outer side of the partition, a removable member applicable over the accessible ends of the terminals, contacts carried by the removable member, and disposed to contact the accessible ends of said terminals, means operable by movement of said flexible wall to energize said terminals, and means associated with the removable member, when applied over the terminals, to deflect said flexible wall, thereby to energize said terminals and in turn said removable member contacts engaged therewith.

19. Means to effect an electrical connection through a partition, one side whereof is normally inaccessible, comprising, in combination, electrical terminals accessible from the outer side of the partition, a flexible wall in the outer side of the partition, a removable member applicable over the accessible ends of the terminals, contacts carried by and insulated from the body of the removable member, and disposed to contact the accessible ends of said terminals, live electrical conductors disposed adjacent but normally out of contact with the inaccessible ends of said terminals, and connected for movement under the influence of said flexible wall, and means associated with the removable member to deflect said flexible wall, upon application of said member over said terminals, thereby to move the live conductors into contact with the terminals, and to energize said removable member contacts engaged therewith.

20. In combination, an electric outlet comprising a face plate, two insulated conductors extending therethrough from its concealed face to its exposed face, means constituting a normally open electric switch, disposed at the concealed face of the face plate, organized and arranged, when closed, to connect the respective conductors in an electric circuit, a movable switch-operating element disposed at the concealed face of the face plate, and normally self-moving to switch-open position, and an attachment member for use with such an outlet, said attachment member comprising a pair of contacts connected, respectively, to the two wires of an electric cord or the like, and disposed to contact the exposed ends of the respective conductors, and means electrically insulated from the contacts, and active, upon application of the attachment member to the exposed face of the face plate, to project an attractive force to effect movement of the switch-operating element, and thereby to effect closure of the electric circuit through the switch, the conductors, the attachment member contacts, and the cord, said switch-operating element including a flexible diaphragm at the exposed face of said face plate, and said attachment-carried means being a separate distendible chamber, which, by application to the diaphragm and its subsequent distention, effects switch-closing movement of the flexible diaphragm.

21. In combination, an electric outlet comprising two floor electric terminals, switch means disposed below the floor surface and operable to energize said terminals and, an electromagnet also disposed below the floor surface and operable when energized to retain said switch means in closed position for energizing said terminals; and an outlet block adapted for application over said outlet, including contacts carried thereby for registration, respectively, with said outlet terminals, and control means on said outlet block operable to complete an operative circuit through said electromagnet for energizing it to hold said switch means in closed position.

22. An electric outlet, comprising a face plate, supply wires behind said face plate for connection to a power source, an outlet block adapted to be positioned over said face plate and carrying distribution wires adapted for connection to a power load, means for transmitting power from said supply wires to said distribution wires, means behind the face plate constituting a normally open electric switch, and when closed energizing said power transmitting means, and switch operating means including an exposed member in inoperative position substantially flush with the outer surface of the face plate, and, when said outlet block is positioned over said face plate, being movable to actuate said switch operating means to close said switch.

DONALD S. ROSS.